(No Model.) 2 Sheets—Sheet 1.

T. HILL.
DUMPING WAGON.

No. 460,871. Patented Oct. 6, 1891.

WITNESSES:
John W. Weemer
C. Sedgwick

INVENTOR:
Thomas Hill
BY Munn & Co.
ATTORNEYS (No Model.) 2 Sheets—Sheet 2.

T. HILL.
DUMPING WAGON.

No. 460,871. Patented Oct. 6, 1891.

Fig. 4ª

WITNESSES:
John W. Deemer
E. M. Clark

INVENTOR:
Thomas Hill
BY Munn & Co.
ATTORNEYS

UNITED STATES PATENT OFFICE.

THOMAS HILL, OF JERSEY CITY, NEW JERSEY.

DUMPING-WAGON.

SPECIFICATION forming part of Letters Patent No. 460,871, dated October 6, 1891.

Application filed January 20, 1891. Serial No. 378,431. (No model.)

*To all whom it may concern:*

Be it known that I, THOMAS HILL, of Jersey City, in the county of Hudson and State of New Jersey, have invented a new and Improved Body-Carriage for Dumping and other Wagons, of which the following is a full, clear, and exact description.

This invention relates to wagons in which the body of the wagon has a rolling action upon or along the truck portion of the vehicle, and in some cases a tilting action as well, to dump its load; and the invention consists in a novel construction of the carrying devices for the bodies of such wagons, substantially as herein described, and more particularly pointed out in the claims.

Reference is to be had to the accompanying drawings, forming a part of this specification, in which similar letters of reference indicate corresponding parts in all the figures.

Figure 1:
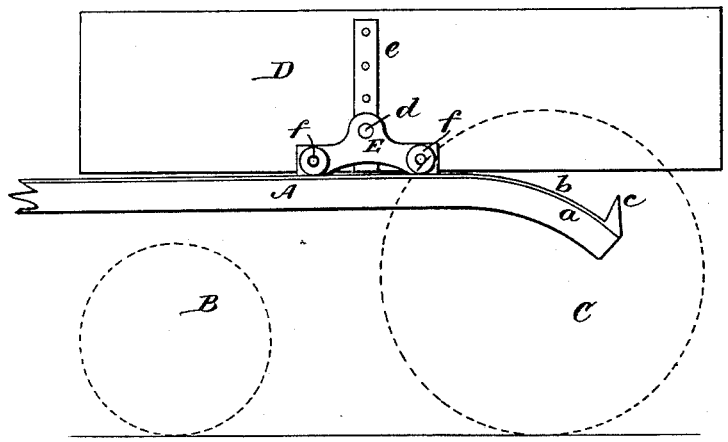
Figure 2:
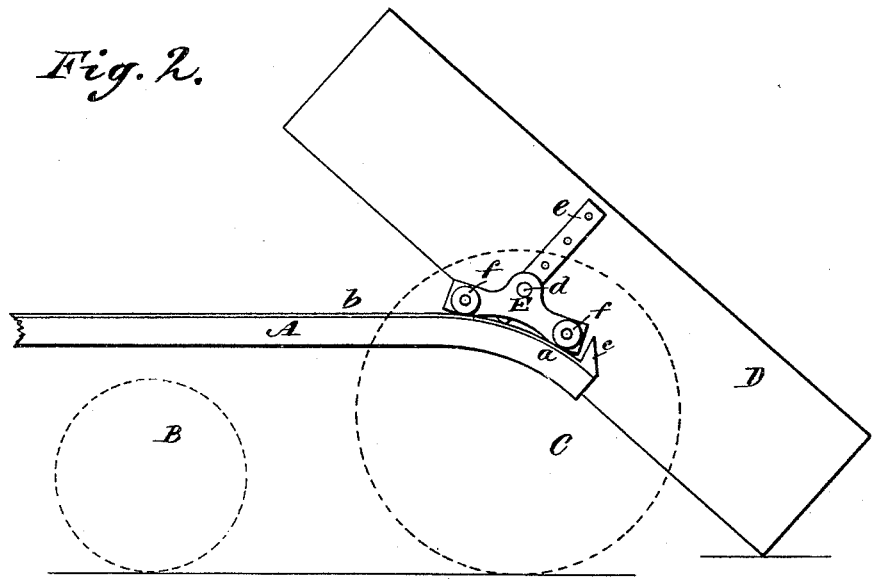
Figure 3:
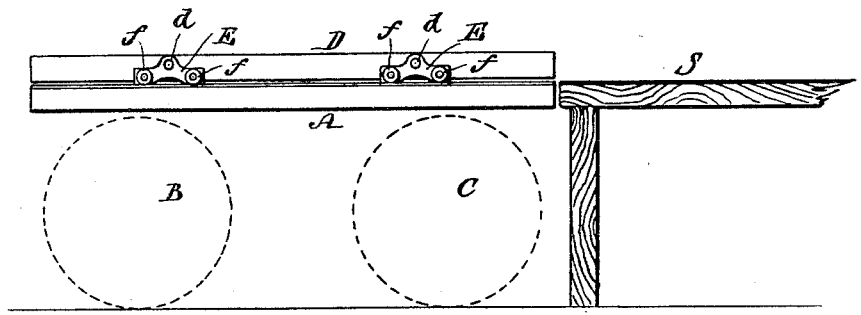
Figure 4:
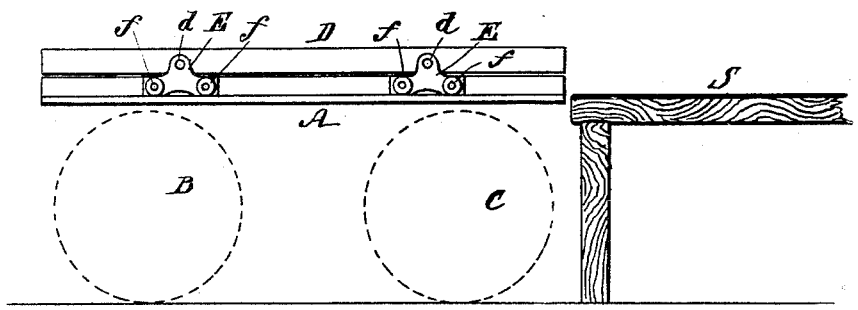
Figure 5:
Figure 6:
Figure 6:
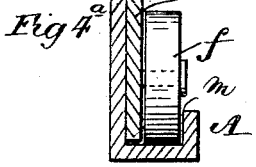

Figure 1 represents a side elevation of a dumping-wagon in part embodying my invention, the body of the wagon being in the position it occupies when not tilted and the running wheels of the vehicle being represented by dotted lines. Fig. 2 is a similar view of like parts, but representing the body of the wagon in its tilted position. Fig. 3 is a side elevation of a wagon in part in which the body of the wagon has only a rolling action upon the frame which carries it, but having my improved body-carriage or roller-carrier in a modified form applied. Fig. 4 is a view similar to Fig. 3 of a like wagon, but showing a modified construction of parts for the roller-carrier to run upon; and Fig. 4ª, an end view of the roller-carrier in part with a transverse section of a modified construction of the track upon which it runs. Fig. 5 is a side view of one of the roller-carriages detached, the rollers being removed; and Fig. 6 is a side view of the same with the rollers in place.

Referring in the first instance to Figs. 1 and 2 of the drawings, A indicates the frame of the wagon in part or side pieces thereof, B C its front and rear running wheels, and D the longitudinally movable and tilting body of the wagon.

The frame A of the wagon on its opposite sides is made to curve or have a pronounced incline downward at its back end portion, as at $a$, to facilitate the tilting of the body D when discharging its load, but is otherwise generally straight on its top and preferably very slightly inclining downward toward its front end to facilitate returning the body to its non-tilting position, where it may be held by any suitable stops. To form a smoother running-surface for the supporting-rollers of the body on each longitudinal or side piece of the frame A said piece has secured on its top a plate or other suitable rail $b$, terminating at its back end in a projection or stop $c$ at the rear end of the curved or inclined portion $a$ to arrest the body D when being tilted.

Pivoted, as at $d$, to the exterior of each side of the body D, intermediately of its length, preferably somewhat nearer the front than the back end of said body, or, which is the same thing, pivoted to a strap $e$, secured to each side of the body, is a roller carrier or carriage E, provided at its lower portion, on opposite sides of the pivot $d$, with rollers $f\,f$, adapted to run upon the side pieces of the frame A or rail $b$, mounted thereon and supporting or carrying the body D. When not tilting the body to dump the load, said body is run forward and made to rest by its rollers $f$ on the straight portion of the side pieces or frame A in advance of the curved or inclined rear portion $a$ of the frame, as shown in Fig. 1; but when required to dump the load by tilting the body, as shown in Fig. 2, said body is run back on either side rail $b$ till arrested by the stop $c$ at the lower back end of the curved or inclined portion $a$, on which the roller-carriage will then rest, and in descending which the tilting of the body or the dumping of the load is facilitated. This is greatly improved by the roller-carriage E being a pendent or pivoted one to the wagon-body, and whereby both the advance and the rear supporting-rollers remain on the frame A or rails $b$ when the front end of the body D occupies a raised position in tilting and the roller-carriage is on or over the curved or inclined rear portion $a$ of the frame.

Referring, in the next instance, more particularly to Figs. 3 and 4 of the drawings, including Figs. 5 and 6, the body D of the wagon, which may either be a platform, box, or other form of wagon, has a series (here shown as two) of the roller-carriers E, pivoted, as at $d$, on the exterior of each of its sides, one carrier being in front of the other. The frame or side piece A on which said roller-body carriers travel, and which may either be faced on its top with a steel rail to form a running-surface for the rollers or be in the form of a side rail, as shown in Fig. 4, is not curved or inclined down in its rear to tilt the wagon-body, but is made straight, or nearly so, to admit of the wagon-body being run on or off a fixed platform S or other receiving structure or surface for the purpose of loading or unloading or transporting it, as required; but each roller-body carrier E is an exterior pivoted one, substantially as shown in Figs. 1 and 2, and, being a pivoted one, will readily conform to variations or changes in the running-surface which said rollers travel upon and will serve to give a steady bearing or support to the wagon-body when on its truck portion or frame.

When the body of the wagon is only a rolling one, as shown in Figs. 3 and 4, then the truck or running wheels B C may be of like size and the wagon-body be run or rolled off from either end, as desired.

In Fig. 4ª the side rail for the roller carrier or carriage E to run upon, and by which the wagon-body, is supported, is made trough-shaped or constructed with a groove m to receive and guide the rollers of the carriage, and whereby said carriage is retained in proper position or prevented from accidental displacement and so that it will be directed straight with the fixed platform or other rail upon which the wagon-body is run off. Said side rail is fastened in any suitable manner to or on the side piece of the truck portion of the vehicle.

In each of the constructions here shown and described the carriage E is provided with rollers and adapted, as described, by a pivot connection for attachment to and operation with the wagon or vehicle.

Having thus described my invention, what I claim as new, and desire to secure by Letters Patent, is—

1. In wagons having longitudinally-movable or rolling bodies upon the truck portion of the frame which supports said bodies, the combination, with the wagon-body on each side thereof, of one or more roller carriers or carriages pivoted, respectively, to the body and each provided with supporting or running rollers, essentially as described.

2. In dumping-wagons, the combination, with the longitudinally-movable and tilting body of the wagon, of a carriage or carrier attached to the exterior of the sides of the body intermediately of the length of the latter and provided with supporting-rollers, and the frame or side pieces of the wagon, adapted to form a running-surface for said rollers and made to curve or incline downward at its rear end, substantially as specified.

3. In dumping-wagons, the combination of the body of the wagon, having on the exterior of its sides, intermediately of the length thereof, a carrier or carriage pivoted to said body and provided with supporting-rollers, and the frame or side pieces of the wagon, made to form rail or running surfaces for said rollers and constructed to curve or incline downward in the rear, substantially as and for the purposes specified.

THOMAS HILL.

Witnesses:
E. M. CLARK,
C. SEDGWICK.